United States Patent
Maury et al.

(10) Patent No.: US 11,821,328 B2
(45) Date of Patent: Nov. 21, 2023

(54) POROUS REGULATOR WITH INTEGRATED VENTILATION

(71) Applicant: LIEBHERR-AEROSPACE TOULOUSE SAS, Toulouse (FR)

(72) Inventors: Damien Maury, Toulouse (FR); David Lossouarn, Toulouse (FR); Jean-Luc Mancho, Toulouse (FR); Mickael Bregoli, Toulouse (FR); Romain Angelique, Toulouse (FR)

(73) Assignee: LIEBHERR-AEROSPACE TOULOUSE SAS, Toulouse (FR)

( * ) Notice: Subject to any disclaimer, the term of this patent is extended or adjusted under 35 U.S.C. 154(b) by 172 days.

(21) Appl. No.: 17/613,476

(22) PCT Filed: May 20, 2020

(86) PCT No.: PCT/FR2020/050840
§ 371 (c)(1),
(2) Date: Nov. 22, 2021

(87) PCT Pub. No.: WO2020/234544
PCT Pub. Date: Nov. 26, 2020

(65) Prior Publication Data
US 2022/0220863 A1    Jul. 14, 2022

(30) Foreign Application Priority Data
May 21, 2019  (FR) ....................................... 1905314

(51) Int. Cl.
*F01D 25/12*      (2006.01)
*F02C 6/08*       (2006.01)
(Continued)

(52) U.S. Cl.
CPC ................ *F01D 25/12* (2013.01); *F02C 6/08* (2013.01); *F16K 49/00* (2013.01); *B33Y 80/00* (2014.12);
(Continued)

(58) Field of Classification Search
CPC .... F01D 25/12; F02C 6/08; F02C 7/14; F02C 7/18; F16K 49/00; B33Y 80/00;
(Continued)

(56) References Cited

U.S. PATENT DOCUMENTS

2013/0283815 A1    10/2013  Simpson
2016/0208694 A1    7/2016   Simpson et al.
2017/0030265 A1*   2/2017   O'Toole ................ F01D 17/145

FOREIGN PATENT DOCUMENTS

CN         206309979         7/2017

* cited by examiner

*Primary Examiner* — Jacob M Amick
*Assistant Examiner* — Charles J Brauch
(74) *Attorney, Agent, or Firm* — CRGO Global; Steven M. Greenberg

(57) ABSTRACT

The invention relates to a regulator, configured to receive a hot air flow via an air inlet (12), to treat this hot air and to transmit the treated hot air to an air outlet (14) configured to supply a pneumatic actuator (16), comprising at least one temperature-sensitive electrical and/or mechanical element (36, 37), and a regulator body (100). The regulator is characterized in that the regulator body is composed of a heat-conducting hollow enclosure (28) at least partially surrounding a duct (22) for transporting the hot air flow, said cavity being at least partially filled with a metal mesh produced by additive manufacturing that allows the cooling air to circulate, and in that the temperature-sensitive electrical and/or mechanical element (36, 37) is arranged in, or
(Continued)

in contact with, the regulator so as to be cooled by the cooling air by thermal conduction.

7 Claims, 3 Drawing Sheets

(51) Int. Cl.
*F16K 49/00* (2006.01)
*B33Y 80/00* (2015.01)
(52) U.S. Cl.
CPC ............... *F05D 2260/2214* (2013.01); *F05D 2260/232* (2013.01); *F05D 2260/606* (2013.01)
(58) Field of Classification Search
CPC ....... F05D 2260/2214; F05D 2260/232; F05D 2260/606; F05D 2230/31; F05D 2270/65; F05D 2300/514; Y02T 50/60; B64D 13/08
See application file for complete search history.

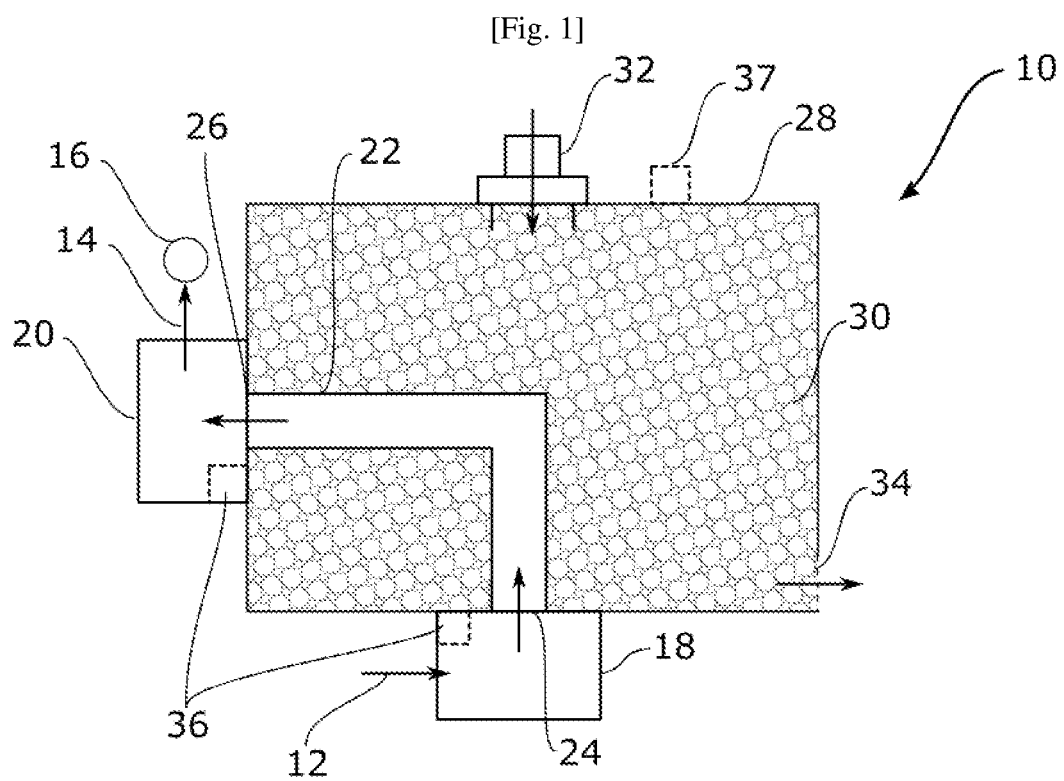
[Fig. 1]

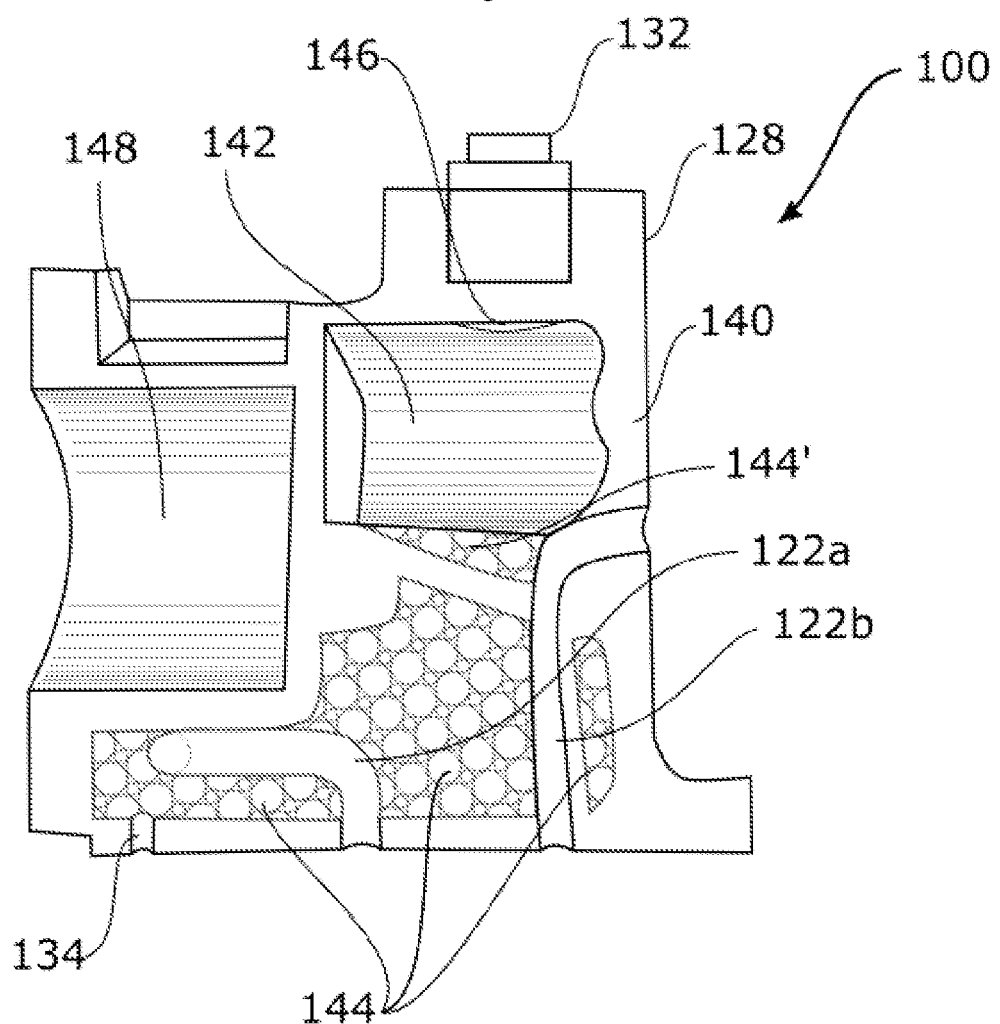
[Fig. 2]

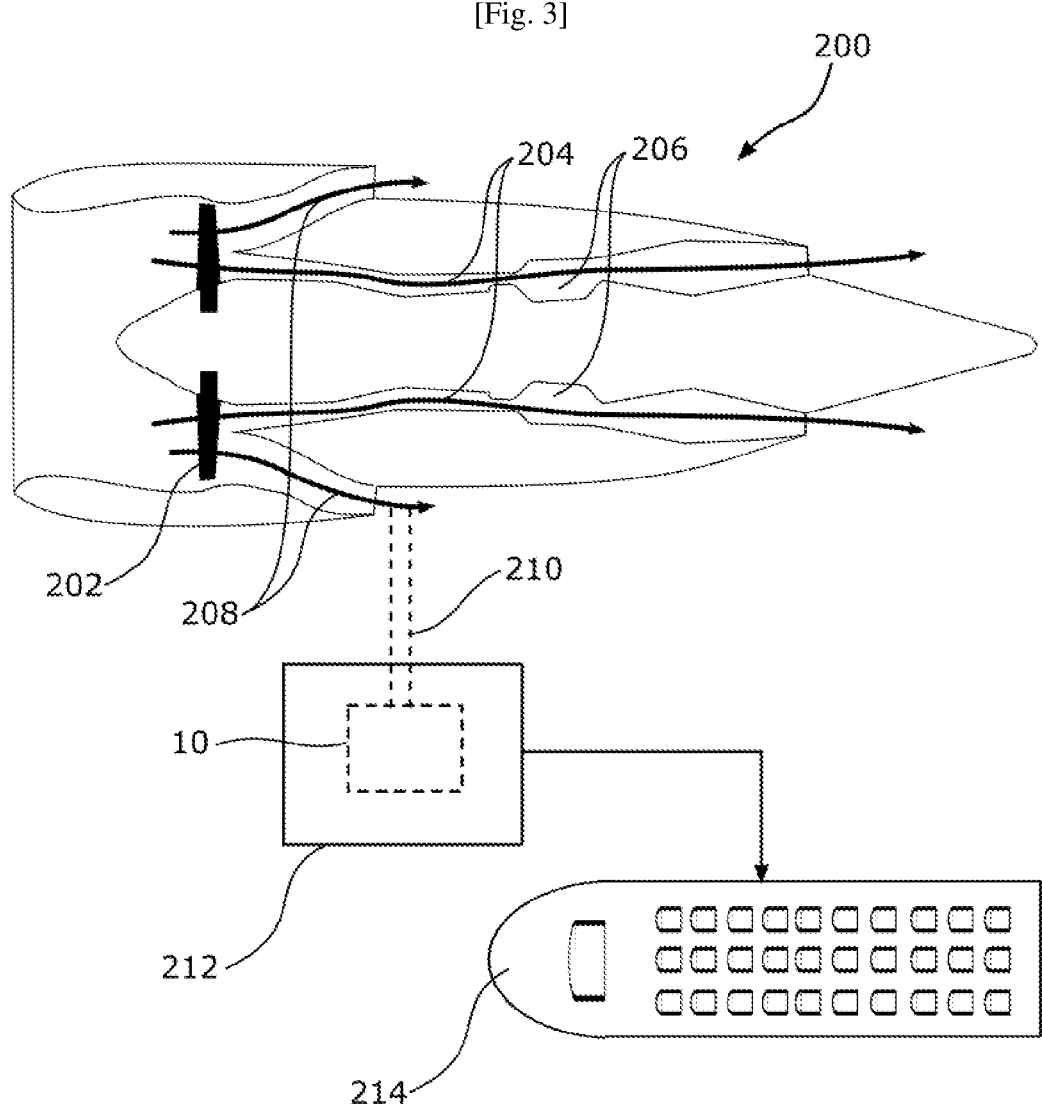
[Fig. 3]

POROUS REGULATOR WITH INTEGRATED VENTILATION

CROSS-REFERENCE TO RELATED APPLICATIONS

This application is a § 371 national phase entry of International Application No. PCT/FR2020/050840, filed May 20, 2020, which claims priority to French Patent Application No. 1905314, filed May 21, 2019.

TECHNICAL FIELD OF THE INVENTION

The invention relates to a regulator. In particular, the invention relates to a regulator for treating hot air carrying pneumatic power, for example to trigger a pneumatic actuator. Such a regulator can be used in an aircraft, in particular to regulate the air supplied to the pneumatic actuator of a valve of the aircraft, in particular a valve of an air bleed or air conditioning system.

TECHNICAL BACKGROUND

The regulator allows the treatment of hot air carrying pneumatic power by various treatment elements. Such a regulator can also be known as "servo control."

When the regulator is used in a severe thermal environment such as an aircraft, it is subjected to strong thermal stresses which require special treatment. In particular, regulators comprise elements which are particularly temperature sensitive, such as solenoids for managing the air flow leaving the regulator, pressure regulating membranes, etc. More generally, the term "temperature-sensitive elements" is understood to mean elements which can in particular be deteriorated at high temperatures, or which have reduced performance at high temperatures.

Current solutions to protect these sensitive elements are for example:
  Offsetting sensitive elements in a protected region: this solution nevertheless requires the addition of pipes to communicate pressure information, which has a significant impact on the cost and complicates installation;
  Adding ventilation to the region, either comprehensively over the entire region, or directed towards sensitive elements: this solution has limited effectiveness on sensitive elements because it is not sufficiently specific to these elements.

The inventors have sought a solution to avoid offsetting sensitive elements and to improve ventilation of sensitive elements of the regulator.

AIMS OF THE INVENTION

The invention thus aims to provide a regulator benefiting from improved cooling.

The invention aims in particular to provide a regulator that allows a valve to be regulated, thus making it possible to form a compact valve without having to offset temperature-sensitive elements in protected regions.

The invention also aims to provide a regulator particularly suitable for use in an aircraft.

DISCLOSURE OF THE INVENTION

To this end, the invention relates to a regulator, configured to receive a hot air flow carrying pneumatic power via an air inlet, to treat this hot air and to transmit the treated hot air to an air outlet configured to supply a pneumatic actuator, comprising at least one temperature-sensitive electrical or mechanical element and a regulator body, characterized in that the regulator body is composed of a heat-conducting hollow enclosure forming a cavity at least partially surrounding a duct for transporting the hot air flow, said cavity comprising a cooling air inlet and being at least partially filled with a structural reinforcing metal mesh that allows the cooling air to circulate from the cooling air inlet to a cooling air outlet, and in that the temperature-sensitive electrical and/or mechanical element is arranged in the cavity or in contact with the hollow enclosure of the regulator body so as to be cooled by the cooling air by thermal conduction.

A regulator according to the invention thus allows the hot air circulating in at least one of the channels thereof to be cooled in order to reduce the risks of physical degradation or degradation of the performance of temperature-sensitive elements of the regulator.

The regulator body supports the elements of the regulator, thus providing part of its structural strength. The regulator body is generally solid in the prior art. Using a metal mesh inside the regulator body helps maintain the structural strength of the body while allowing the passage of cooling air therein. The cooling air provides convection cooling.

The metal mesh can occupy all or part of the space formed by the cavity. Parts requiring structural strength can be reinforced by adding the metal mesh; other less critical parts can be left empty so that cooling air can circulate; and other very critical parts can remain solid as long as cooling air can flow through the regulator body.

Advantageously and according to the invention, the metal mesh is produced by additive manufacturing.

Additive manufacturing of the metal mesh makes it possible to form a metal mesh of the desired design, making it possible to best meet structural constraints as well as constraints in terms of passage of the cooling air.

Advantageously and according to the invention, the cooling air outlet is arranged on the regulator body opposite the cooling air inlet, so that the cooling air passes through the cavity of the regulator body.

According to this variant of the invention, the cooling air passes through a large 20 volume of the cavity of the regulator body so as to maximize the cooling of the channels and of the temperature-sensitive electrical or mechanical element(s), by being in contact with a larger part of the heat-conducting hollow enclosure.

Advantageously and according to the invention, each temperature-sensitive mechanical and/or electrical element is selected from the following list of elements:—a membrane,
  a membrane of a hot air expansion device carrying pneumatic power,
  a solenoid,
  a torque motor.

The membrane is for example a valve membrane or a membrane of an expansion device and allows, for example, the pressure of the hot air flow to be compared with a reference pressure. More generally, the membrane can be any membrane that allows two pressures exerted on either side thereof to be compared.

The solenoid allows in particular the air flow leaving the regulator to be managed, by opening or closing a valve allowing the quantity of air necessary for the activation of the pneumatic actuator to be released at the desired time.

Other electromechanical, electrical or electronic components can also form the temperature-sensitive elements.

Advantageously and according to the invention, the cooling air is flow air drawn from a turbomachine.

According to this aspect of the invention, the flow air of the turbomachine (also called fan air) forms particularly advantageous cooling air in an aircraft because it is the source of air among the coldest available in the aircraft.

The flow air is air set in motion by the turbomachine. When the turbomachine is a turbojet, the flow air used and the flow air forming the secondary flow are set in motion by the fan of the turbojet.

The flow air is also pressurized at the outlet of the turbomachine, which allows ventilation of the regulator body without requiring any particular device to set the flow air in motion.

The invention also relates to a valve actuated by a pneumatic actuator, 25 characterized in that said valve comprises a regulator according to the invention configured to supply said pneumatic actuator.

By equipping a valve with a regulator according to the invention, it is possible to form a compact valve in which all the elements of the valve are arranged close to one another, without the need to offset some of the elements of the valve, in particular
the temperature-sensitive elements of the regulator.

The valve can for example be used in an air bleed or air conditioning system of an aircraft.

The invention also relates to an aircraft comprising at least one turbomachine, characterized in that said aircraft comprises a regulator according to the invention, and channels for conducting flow air from the turbomachine to the cooling air inlet of the regulator, the flow air from the turbomachine thus forming the cooling air of the regulator.

The invention also relates to a regulator, a valve and an aircraft which are characterized in combination by all or some of the features mentioned above or below.

LIST OF FIGURES

Further aims, features and advantages of the invention will become apparent upon reading the following description, which is provided solely by way of a non-limiting example, and which refers to the accompanying figures, in which:

FIG. 1 is a schematic cross-sectional view of a regulator according to one embodiment of the invention.

FIG. 2 is a schematic cross-sectional view of a regulator body according to one embodiment of the invention.

FIG. 3 is a simplified schematic view of an air conditioning system according to one embodiment of the invention.

DETAILED DESCRIPTION OF ONE EMBODIMENT OF THE INVENTION

For the sake of illustration and clarity, scales and proportions are not strictly adhered to in the figures.

Moreover, identical, similar or analogous elements are denoted using the same reference signs throughout the figures.

FIG. 1 schematically illustrates in cross-section a regulator 10 according to one embodiment of the invention.

The regulator 10 is configured to receive a hot air flow carrying pneumatic power via an air inlet 12, to treat this hot air and to transmit the treated hot air to an air outlet 14 configured to supply a pneumatic actuator 16.

The air inlet 12 of the regulator is at a first mechanical interface 18 and the air outlet 14 is at a second mechanical interface 20. The first and second mechanical interfaces are for example air treatment devices such as an expansion device, a flow control valve, etc. These mechanical interfaces comprise temperature-sensitive mechanical or electrical elements 36 such as a membrane of the expansion device, or a solenoid for activating the valve.

Temperature-sensitive mechanical or electrical elements 37 may also be arranged on the regulator body.

The hot air flow passing through the first mechanical interface 18 enters a duct 22 via a duct inlet 24 and leaves said duct via a duct outlet 26 to reach the second mechanical interface 20.

According to other embodiments, the regulator can comprise more ducts interconnecting at least three mechanical interfaces.

In the prior art, such a duct would be either in the open air or surrounded by a solid regulator body forming a solid enclosure around the duct.

In this embodiment of the invention, the regulator comprises a regulator body composed of a hollow enclosure 28 forming a cavity 30 at least partially, in this case entirely, surrounding the duct 22.

The regulator body comprises a cooling air inlet 32 and a cooling air outlet 34 that allows the cooling air to circulate inside the cavity 30. The cooling air inlet 32 is for example a nipple to which a duct supplying cooling air to the regulator can be connected. The cooling air outlet 34 can for example be connected to the ambient air.

The use of a completely hollow cavity would create structural risks for the regulator, the regulator body having a support function in the prior art. Thus, in this embodiment of the invention, the cavity is at least partially, in this case fully, filled with a metal mesh produced by additive manufacturing that allows the cooling air to circulate while guaranteeing its structural resistance.

The metal mesh is a good compromise between a solid regulator body which would not allow the passage of cooling air and an empty regulator body which does not guarantee the structural resistance of the regulator body. To allow specific structural reinforcements at critical locations, the regulator 10 may also comprise, in other embodiments, solid parts as long as they do not obstruct the cooling air flow between the cooling air inlet 32 and the cooling air outlet 34.

The circulation of the cooling air through the metal mesh makes it possible to cool the hot air circulating in the duct 22.

In addition, the metal mesh and the hollow enclosure 28 are heat conductors, which makes it possible to cool, by thermal conduction, the temperature-sensitive elements 36, 37, for example located in the mechanical interfaces which are directly or thermally connected to the metal mesh via the duct 22 and/or the hollow enclosure 28, the duct inlet 24, the duct outlet 26, etc.

FIG. 2 schematically illustrates in cross-section a regulator body 100 according to a second embodiment of the invention.

The regulator body 100 comprises a hollow enclosure forming a cavity surrounding two ducts: a first duct 122a and a second duct 122b.

The regulator body comprises parts 140 forming the periphery of the enclosure and which can be used to reinforce the structure at sensitive points. The cavity is formed of hollow parts, in particular a completely hollow recess 142, as well as of metal mesh 144 and of a transient part 144' filled with metal mesh directly connected to the recess 142 and the metal mesh 144.

The cooling air enters through a cooling air inlet 132 formed by a nipple, enters the recess 142 through an orifice 146, reaches the transient part 144 and circulates in the metal mesh 144. Cooling air leaves the regulator body 100 through a cooling air outlet 134.

The regulator body can be shaped to match the mechanical interfaces of the regulator, for example it can comprise a location 148 in which the regulator expansion device can be arranged.

The metal mesh is represented in FIGS. 1 and 2 by a plurality of circles joined together for illustrative purposes, but can take different forms.

FIG. 3 schematically and in a simplified manner represents an air conditioning system according to one embodiment of the invention, installed in an aircraft and comprising a regulator according to one of the embodiments described above.

The aircraft comprises a turbomachine, in particular a turbojet 200, shown in a simplified manner, comprising a fan 202 allowing the formation of two air flows: a primary air flow 204 intended to be compressed and then injected into a combustion chamber 206, and a secondary air flow 208 circulating around the part of the turbojet 200 treating the primary air flow 204.

This secondary air flow, which is cold because it comes from the outside air entering the turbojet and has a dynamic pressure generated by the fan 202, forms flow air, also called fan air because it is set in motion by the fan, which is drawn via a duct 210 leading to the regulator 10. The flow air thus drawn can be led to the cooling air inlet, making it possible to cool and ventilate the cavity of the regulator body and thus the temperature-sensitive elements, such as the membrane of the expansion device, the solenoid and/or any electrical or mechanical element sensitive to the desired temperature.

The regulator 10 is advantageously integrated into an air treatment system 212 intended, for example, to condition the air in the cabin 214 of the aircraft. The regulator 10 can, for example, control a pneumatic actuator making it possible to ensure pressure regulation.

The invention claimed is:

1. A regulator, configured to receive a hot air flow carrying pneumatic power via an air inlet, to treat the hot air and to transmit the treated hot air to an air outlet configured to supply a pneumatic actuator, comprising:
at least one temperature-sensitive electrical and/or mechanical element, and
a regulator body, comprising a heat-conducting hollow enclosure forming a cavity at least partially surrounding a duct for transporting the hot air flow, said cavity comprising a cooling air inlet and being at least partially filled with a structural reinforcing metal mesh that allows the cooling air to circulate from the cooling air inlet to a cooling air outlet,
wherein the temperature-sensitive electrical and/or mechanical element is arranged in the cavity or in contact with the hollow enclosure of the regulator body so as to be cooled by the cooling air by thermal conduction.

2. The regulator according to claim 1, wherein the metal mesh is produced by additive manufacturing.

3. The regulator according to claim 1, wherein the cooling air outlet is arranged on the regulator body opposite the cooling air inlet, so that the cooling air passes through the cavity of the regulator body.

4. The regulator according to claim 1, wherein each temperature-sensitive electrical and/or mechanical element is selected from the group consisting of:
a membrane,
a membrane of a hot air expansion device carrying pneumatic power,
a solenoid, and
a torque motor.

5. The regulator according to claim 1, wherein the cooling air is flow air drawn from a turbomachine.

6. A valve actuated by a pneumatic actuator, wherein said valve comprises a regulator configured to supply said pneumatic actuator said regulator comprising:
at least one temperature-sensitive electrical and/or mechanical element, and
a regulator body comprising a heat-conducting hollow enclosure forming a cavity at least partially surrounding a duct for transporting the hot air flow, said cavity comprising a cooling air inlet and being at least partially filled with a structural reinforcing metal mesh that allows the cooling air to circulate from the cooling air inlet to a cooling air outlet,
wherein the temperature-sensitive electrical and/or mechanical element is arranged in the cavity or in contact with the hollow enclosure of the regulator body so as to be cooled by the cooling air by thermal conduction.

7. An aircraft comprising at least one turbomachine, wherein said aircraft comprises a regulator, and channels for conducting flow air from the turbomachine to the cooling air inlet, the flow air from the turbomachine thus forming the cooling air of the regulator said regulator comprising:
at least one temperature-sensitive electrical and/or mechanical element, and
a regulator body comprising a heat-conducting hollow enclosure forming a cavity at least partially surrounding a duct for transporting the hot air flow, said cavity comprising a cooling air inlet and being at least partially filled with a structural reinforcing metal mesh that allows the cooling air to circulate from the cooling air inlet to a cooling air outlet,
wherein the temperature-sensitive electrical and/or mechanical element is arranged in the cavity or in contact with the hollow enclosure of the regulator body so as to be cooled by the cooling air by thermal conduction.

* * * * *